(12) United States Patent
Matsumura (10) Patent No.: US 10,706,299 B2
(45) Date of Patent: Jul. 7, 2020

(54) CONTROL SYSTEM OF VEHICLE (71) Applicant: Toyota Jidosha Kabushiki Kaisha, Toyota-shi Aichi-ken (JP)

(72) Inventor: Takeshi Matsumura, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 304 days.

(21) Appl. No.: 15/870,533

(22) Filed: Jan. 12, 2018

(65) Prior Publication Data

US 2018/0204079 A1 Jul. 19, 2018

(30) Foreign Application Priority Data

Jan. 17, 2017 (JP) .................................. 2017-005880

(51) Int. Cl.
*G06K 9/00* (2006.01)
*B62D 6/00* (2006.01)
*B60W 50/12* (2012.01)

(52) U.S. Cl.
CPC ......... *G06K 9/00845* (2013.01); *B60W 50/12* (2013.01); *B62D 6/007* (2013.01)

(58) Field of Classification Search
CPC .............. G06K 9/00845; B60W 50/12; B60W 2410/42; B60W 2540/225; B62D 6/007; B60K 28/066
See application file for complete search history.

(56) References Cited

U.S. PATENT DOCUMENTS

| 9,637,163 | B2* | 5/2017 | Mayer | ................... B62D 15/00 |
| 2009/0115846 | A1* | 5/2009 | Ohue | ................... B60R 11/04 |
| | | | | 348/148 |
| 2015/0251688 | A1* | 9/2015 | Mayer | ................... B62D 15/00 |
| | | | | 180/402 |
| 2015/0294169 | A1* | 10/2015 | Zhou | ....................... G06F 3/013 |
| | | | | 348/148 |
| 2019/0184909 | A1* | 6/2019 | Shiota | .................. A61B 5/0077 |

FOREIGN PATENT DOCUMENTS

| DE | 197 34 307 A1 | 2/1999 | |
| DE | 19734307 C2 * | 6/1999 | ............... B62D 6/00 |
| DE | 10 2008 044 075 A1 | 5/2010 | |
| DE | 102008044075 A1 * | 5/2010 | ............. B62D 6/007 |
| JP | 2014115859 A | 6/2014 | |
| JP | 201657839 A | 4/2016 | |

* cited by examiner

*Primary Examiner* — Peter D Nolan
(74) *Attorney, Agent, or Firm* — Dinsmore & Shohl LLP (57) ABSTRACT

The control system of a vehicle comprises: a driver monitor camera capturing an face of a driver of a vehicle to generate a facial image of the driver; a driver condition detection part configured to detect a condition of the driver based on the facial image; a steering system operating wheels and a steering wheel of the vehicle; and a steering control part configured to set a target turning angle of the wheels and a target steering angle of the steering wheel to control the steering system. The steering control part is configured to make an upper limit value of the target steering angle a value up to a maximum angle when one eye of the driver is not hidden by the steering wheel in the facial image generated when the driver is facing the front.

9 Claims, 6 Drawing Sheets

CONTROL SYSTEM OF VEHICLE

CROSS-REFERENCE TO RELATED APPLICATIONS

This application claims priority to Japanese Patent Application No. 2017-005880 filed Jan. 17, 2017, which is incorporated herein by reference in its entirety.

TECHNICAL FIELD

The present disclosure relates to a control system of a vehicle.

BACKGROUND ART

In the past, a device for detecting a facial direction etc., of a driver using an image capturing means provided in a vehicle has been known. For example, PLT 1 describes that the facial direction of the driver and the angular velocity in the facial direction are calculated from the image of the driver captured by an image capturing means and, if the facial direction of the driver is outside the range of capture of the image capturing means, the facial direction is estimated based on the angular velocity in the facial direction.

CITATION LIST

Patent Literature

PLT 1: Japanese Patent Publication No. 2016-057839A
PLT 2: Japanese Patent Publication No. 2014-115859A

SUMMARY

Technical Problem

However, if a steering wheel is positioned between the image capturing means and the driver, when the amount of turning of the steering wheel becomes greater, capture of the image of the driver is obstructed by the spoke parts etc., of the steering wheel. For this reason, even if the driver is facing the front, sometimes the main parts of the face cannot be detected in the facial image of the driver. As a result, in the method of detection described in PLT 1, it is not possible to detect the facial direction of the driver if the facial direction of the driver changes while the main parts of the face are hidden by the steering wheel.

Therefore, the object of the present disclosure is to provide a control system of a vehicle able to reduce the drop in the precision of detection of the driver condition due to the face of the driver being hidden by the steering wheel.

Solution to Problem

The summary of the present disclosure is as follows.

(1) A control system of a vehicle comprising: a driver monitor camera capturing an face of a driver of a vehicle to generate a facial image of the driver, a driver condition detection part configured to detect a condition of the driver based on the facial image, a steering system operating wheels and a steering wheel of the vehicle, and a steering control part configured to set a target turning angle of the wheels and a target steering angle of the steering wheel to control the steering system, wherein the steering wheel is positioned between the driver monitor camera and the driver, and the steering control part is configured to make an upper limit value of the target steering angle a value up to a maximum angle when one eye of the driver is not hidden by the steering wheel in the facial image generated when the driver is facing the front.

(2) The control system of a vehicle described in above (1), wherein the steering control part makes the upper limit value the maximum angle.

(3) The control system of a vehicle described in above (1), wherein the driver condition detection part is configured to detect a line of sight or a facial direction of the driver, and the steering control part is configured to make the upper limit value a maximum angle when both eyes of the driver are not hidden by the steering wheel in the facial image generated when the driver is facing the front.

(4) The control system of a vehicle described in any one of above (1) to (3), wherein the steering control part is configured to set the upper limit value based on the facial image generated by the driver monitor camera when the steering wheel is operated.

(5) The control system of a vehicle described in above (4), wherein the steering control part is configured to set the upper limit value for each driver.

Advantageous Effects of Present Disclosure

According to the present disclosure, there is provided a control system of a vehicle able to reduce the drop in the precision of detection of the driver condition due to the face of the driver being hidden by the steering wheel.

DESCRIPTION OF EMBODIMENT

Below, referring to the drawings, embodiments of the present disclosure will be explained in detail. Note that, in the following explanation, similar component elements will be assigned the same reference numerals.

First Embodiment

Figure 1:
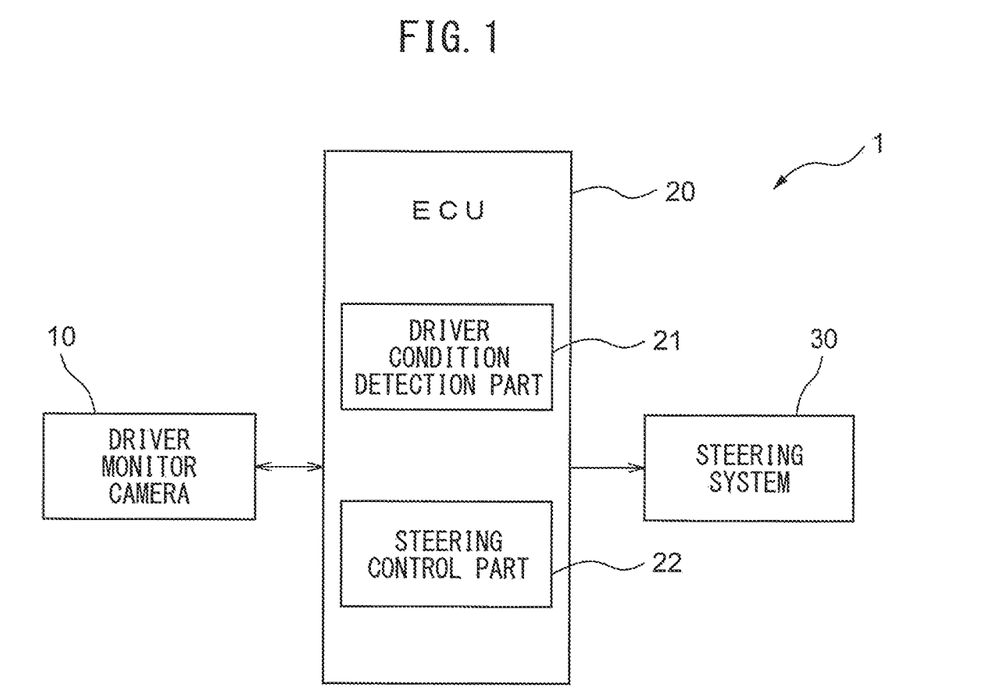
FIG. 1 is a block diagram showing the configuration of a control system of a vehicle according to a first embodiment of the present disclosure.

Below, referring to FIG. 1 to FIG. 6, a first embodiment of the present disclosure will be explained. FIG. 1 is a block diagram showing the configuration of a control system of a vehicle according to the first embodiment of the present disclosure. The control system 1 of a vehicle is mounted in a vehicle. The control system 1 of the vehicle is provided with a driver monitor camera 10, an electronic control unit (ECU) 20, and a steering system 30.

Figure 2:
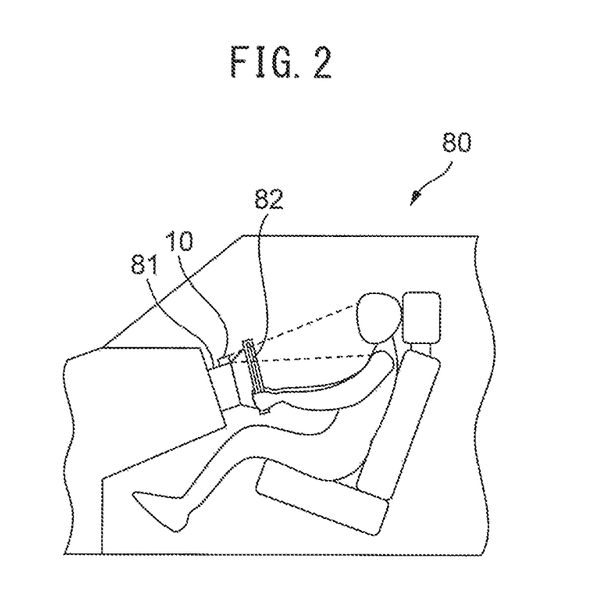
FIG. 2 is a view schematically showing the inside of a vehicle mounting a control system of a vehicle.

FIG. 2 is a view schematically showing the inside of a vehicle mounting a control system of a vehicle. The driver monitor camera 10 captures a face of the driver of the vehicle 80 to generate a facial image of the driver. The driver monitor camera 10 is provided inside the vehicle. Specifically, as shown in FIG. 2, the driver monitor camera 10 is provided at the top of a steering wheel column 81 of the vehicle 80. FIG. 2 shows a range of projection of the driver monitor camera 10 by broken lines. Note that, the driver monitor camera 10 may be provided at instrument panel, instrument panel hood, etc., of the vehicle 80.

The driver monitor camera 10 is comprised of a camera and projector. For example, the camera is a CMOS (complementary metal oxide semiconductor) camera or COD (charge coupled device) camera, while the projector is an LED (light emitting diode). Further, in order to enable the face of the driver to be captured without making the driver uncomfortable even during other low luminance time such as night, etc., and in some embodiments, the projector is a near-infrared LED. For example, the projector is two near-infrared LEDs arranged at the two sides of the camera. Further, the camera may be provided with a filter such as a visible light cutting filter. The facial image of the driver generated by the driver monitor camera 10 is transmitted from the driver monitor camera 10 to the ECU 20.

Figure 3:
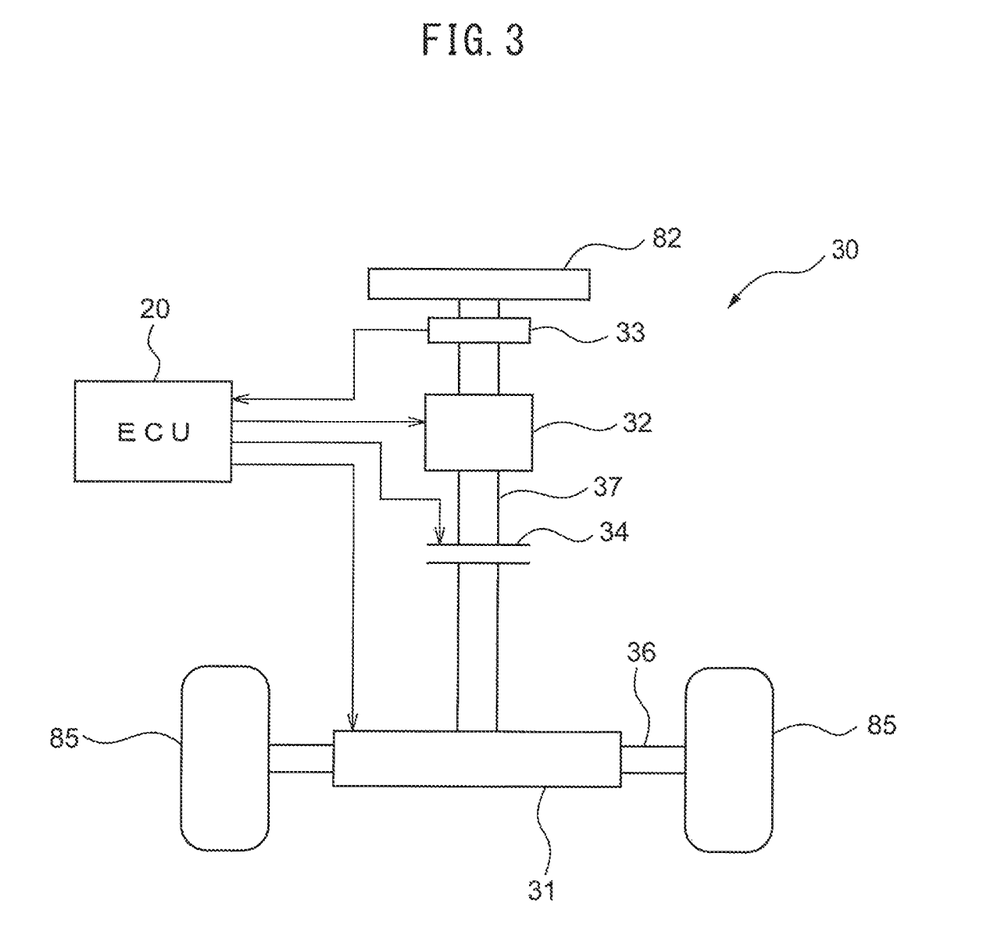
FIG. 3 is a view schematically showing one example of a steering system.

FIG. 3 is a view schematically showing one example of a steering system. The steering system 30 shown in FIG. 3 is a so-called "steer-by-wire type steering system". The steering system 30 operates the wheels (front wheels) 85 and the steering wheel 82 of the vehicle 80. The steering system 30 is provided with a turning actuator 31, steering reaction force actuator 32, steering angle sensor 33, and clutch 34.

The turning actuator 31 drives a shaft 36 between tie rods to control the turning angle of wheels (front wheels) 85. The steering reaction force actuator 32 drives a steering shaft 37 to give a steering reaction force to the driver when the vehicle 80 is being manually driven by the driver. Further, the steering reaction force actuator 32 drives the steering shaft 37 to control the steering angle of the steering wheel 82 when the vehicle 80 is being automatically driven by the automated driving system of the vehicle 80. The steering actuator 31 and steering reaction force actuator 32 are connected to the ECU 20. The operations of the steering actuator 31 and steering reaction force actuator 32 are controlled by the ECU 20.

The steering angle sensor 33 is provided at the steering shaft 37 between the steering wheel 82 and the steering reaction force actuator 32, and detects the steering angle of the steering wheel 82. When the vehicle 80 is being manually driven by the driver, that is, when the steering wheel 82 is being operated by the driver, the turning angle of the wheels 85 is controlled through the steering actuator 31 based on the steering angle detected by the steering angle sensor 33. The steering angle sensor 33 is connected to the ECU 20, and the output value of the steering angle sensor 33 is transmitted to the ECU 20.

The clutch 34 is provided as a fail-safe mechanism. When the steering system 30 breaks down, the steering wheel 82 and the wheels 85 are mechanically connected. When the steering system 30 has not broken down, the clutch 34 is disengaged and the steering wheel 82 and wheels 85 are mechanically separated. In this case, the steering system 30 can operate the steering wheel 82 and wheels 85 independently. That is, the steering system 30 can control the turning angle of the wheels 85 regardless of the steering angle of the steering wheel 82. The clutch 34 is connected to the ECU 20. The operation of the clutch 34 is controlled by the ECU 20.

The ECU 20 is a microcomputer provided with components connected with each other by a bidirectional bus such as a central processing unit (CPU), read only memory (ROM), random access memory (RAM), input port, and output port. In the present embodiment, one ECU 20 is provided, but a plurality of ECUs may be provided for the different functions. As shown in FIG. 1, the ECU 20 includes a driver condition detection part 21 and a steering control part 22. The driver condition detection part 21 detects the condition of the driver based on the facial image of the driver generated by the driver monitor camera 10. The steering control part 22 sets the target turning angle of the wheels 85 and the target steering angle of the steering wheel 82, and controls the steering system 30 to control the steering of the vehicle 80.

As shown in FIG. 2, the steering wheel 82 is positioned between the driver monitor camera 10 and the driver. In this case, the driver monitor camera 10 captures the driver through the steering wheel 82. For this reason, if the amount of turning of the steering wheel 82, that is, the steering angle of the steering wheel 82, becomes larger, the spoke parts etc., of the steering wheel 82 will obstruct the capture of the driver.

Specifically, if turning the steering wheel 82 to the right (clockwise) seen from the driver's side, along with the increase of the turning amount, the main parts of the face of the driver are hidden by the steering wheel 82 in the order of the mouth, nose, left eye, and right eye. On the other hand, if turning the steering wheel 82 to the left (counterclockwise) seen from the driver's side, along with the increase of the turning amount, the main parts of the face of the driver are hidden by the steering wheel 82 in the order of the mouth, nose, right eye, and left eye. For this reason, at the time of steering of the vehicle 80, even if the driver has been facing the front, sometimes the main parts of the face of the driver are hidden by the steering wheel 82, and the precision of detection of the driver condition falls.

Therefore, in the present embodiment, the steering angle of the steering wheel 82 at the time of steering of the vehicle 80 is restricted. Specifically, the steering control part 22 makes an upper limit value of the target steering angle a value up to the maximum angle when one eye of the driver is not hidden by the steering wheel 82 in the facial image of the driver generated when the driver is facing the front. The upper limit value of the target steering angle is stored for example in the ROM or RAM of the ECU 20. Note that, the upper limit value of the target steering angle is set to a value larger than zero.

Due to the above-mentioned control, in the present embodiment, even at the time of steering of the vehicle 80, at least one eye of the driver is not hidden by the steering wheel 82, so it is possible to reduce the drop in precision of detection of the driver condition due to the face of the driver being hidden by the steering wheel 82. Further, even if the steering of the vehicle 80 is controlled by the automated driving system, since the steering wheel 82 is operated by the steering system 30, the behavior of the vehicle 80 when being automatically driven can be easily predicted by the driver. Furthermore, it is possible to smoothly switch from automated driving to manual operation (override).

Figure 4:
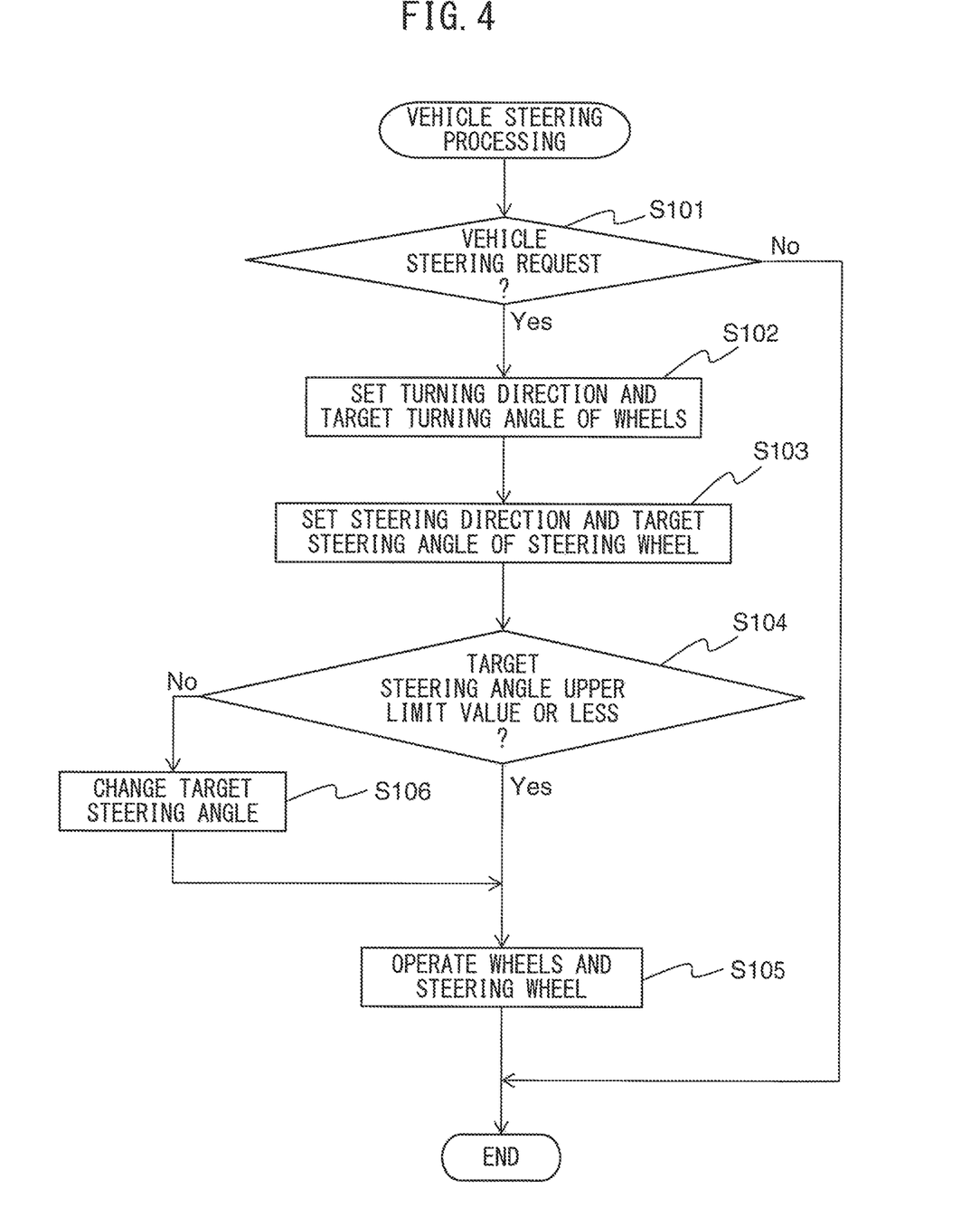
FIG. 4 is a flow chart showing a control routine of vehicle steering processing in the first embodiment.

Below, referring to the flow charts of FIG. 4 and FIG. 5, the control performed by the control system 1 of a vehicle will be explained in detail. FIG. 4 is a flow chart showing a control routine of vehicle steering processing in the first embodiment. The present control routine is repeatedly performed by the ECU 20 while automated driving of the vehicle 80 is performed. In the present control routine, steering of the vehicle 80 is controlled.

First, at step S101, the steering control part 22 judges whether there has been a request for steering of the vehicle 80. For example, the steering control part 22 judges that there is a request for steering of the vehicle 80 when steering of the vehicle 80 is considered required for the vehicle 80 to run on the driving path of the vehicle 80 generated by the automated driving system. If at step S101 it is judged that there has been no request for steering of the vehicle 80, the present control routine is ended. On the other hand, if it is judged that there is a request for steering of the vehicle 80, the present control routine proceeds to step S102.

At step S102, the steering control part 22 sets the turning direction and target turning angle of the wheels 85. For example, the steering control part 22 sets the turning direction and target turning angle of the wheels 85 based on the driving path, speed, etc., of the vehicle 80. The speed of the vehicle 80 is detected by a vehicle speed sensor provided at the vehicle 80.

Next, at step S103, the steering control part 22 sets the steering direction and target steering angle of the steering wheel 82. The steering control part 22 sets the steering direction of the steering wheel 82 based on the turning direction of the wheels 85. Further, the steering control part 22 sets the steering angle of the steering wheel 82 required for obtaining the target turning angle in manual driving as the target steering angle.

Next, at step S104, the steering control part 22 judges whether the target steering angle set at step S103 is the upper limit value or less. The upper limit value of the target steering angle is set in advance experimentally and is the maximum angle when one eye of the driver is not hidden by the steering wheel 82 in the facial image of the driver generated when the driver is facing the front or is less. For example, the upper limit value is set to the maximum angle when one eye of the driver is not hidden by the steering wheel 82 in the facial image of the driver generated when the driver is facing the front. In this case, the upper limit value of the target steering angle is for example 35°. Note that, the upper limit value may be a value different for each steering direction of the steering wheel 82. If at step S104 it is judged that the target steering angle is the upper limit value or less, the present control routine proceeds to step S105.

At step S105, the steering control part 22 uses the steering system 30 to operate the wheels 85 and steering wheel 82. The steering control part 22 operates the wheels 85 according to the turning direction and target turning angle of the wheels 85 set at step S102. Further, the steering control part 22 operates the steering wheel 82 in accordance with the steering direction and target steering angle of the steering wheel 82 set at step S103. After step S105, the present control routine is ended.

On the other hand, if at step S104 it is judged that the target steering angle is larger than the upper limit value, the present control routine proceeds to step S106. At step S106, the steering control part 22 changes the target steering angle. Specifically, the steering control part 22 makes the target steering angle smaller. For example, the steering control part 22 changes the target steering angle to the upper limit value so as to make the target steering angle as close as possible to the steering angle at the time of manual driving.

After step S106, at step S105, the steering control part 22 uses the steering system 30 to operate the wheels 85 and steering wheel 82. The steering control part 22 operates the steering wheel 82 in accordance with the steering direction of the steering wheel 82 set at step S103 and the target steering angle set at step S106. After step S105, the present control routine ends.

Figure 5:
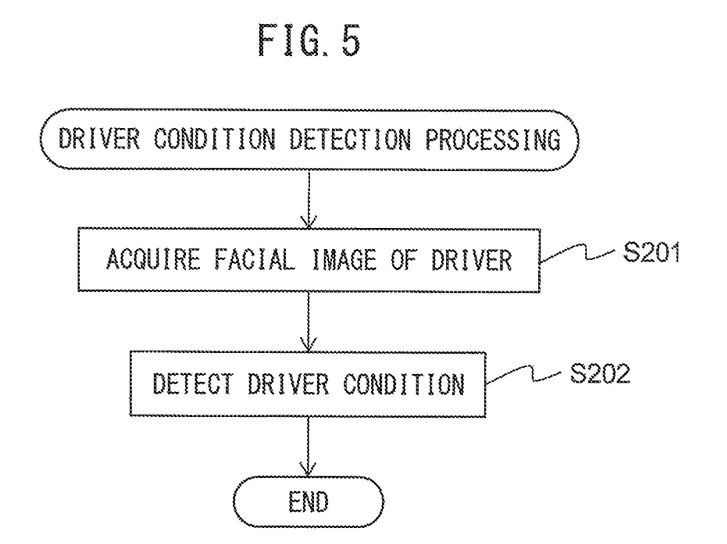
FIG. 5 is a flow chart showing a control routine of driver condition detection processing in the first embodiment.

FIG. 5 is a flow chart showing a control routine of the driver condition detection processing in the first embodiment. The present control routine is repeatedly performed by the ECU 20 while automated driving of the vehicle 80 is performed. In the present control routine, the driver condition is detected.

First, at step S201, the driver condition detection part 21 acquires the facial image of the driver from the driver monitor camera 10. The facial image of the driver is generated by the driver monitor camera 10.

Next, at step S202, the driver condition detection part 21 detects the driver condition based on the facial image of the driver. For example, the driver condition detection part 21 detects that the driver has dozed off based on the opening degree of one eye when one eye is detected from the facial image of the driver, and detects that the driver has dozed off or is looking aside based on the opening degree of both eyes and the line of sight or facial direction of the driver when both eyes are detected from the facial image of the driver. After step S202, the present control routine is ended.

Note that, as long as the steering system 30 can restrict the steering angle of the steering wheel 82 while freely controlling the turning angle of the wheels 85, a steering system other than the steer-by-wire type may be used.

Figure 6:
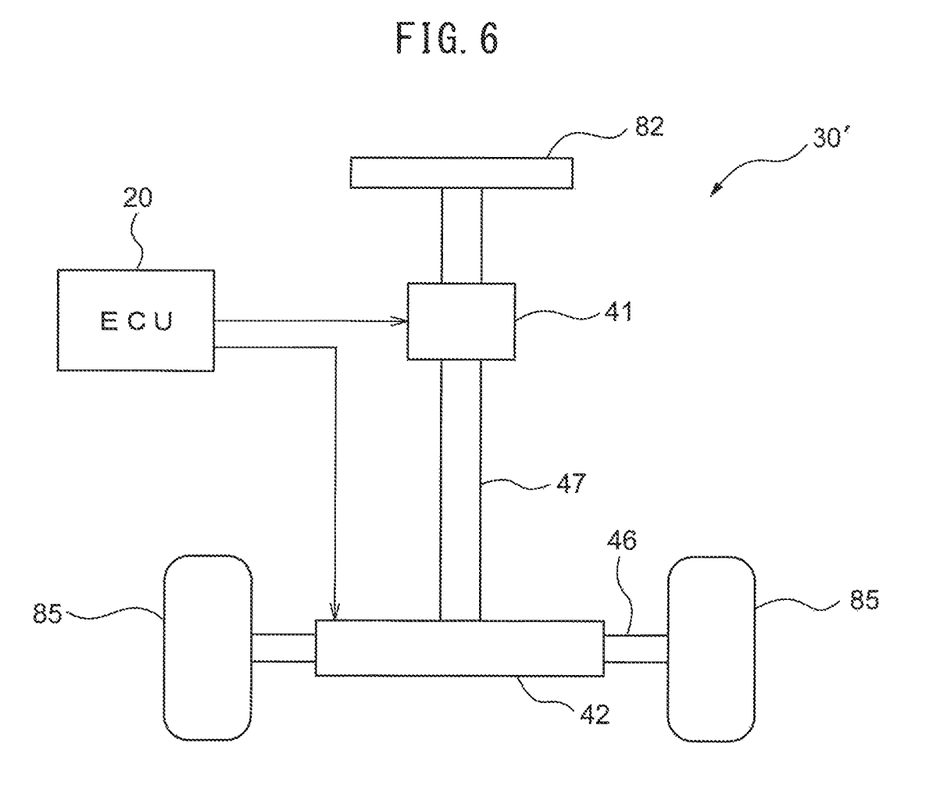
FIG. 6 is a view schematically showing another example of a steering system.

FIG. 6 is a view schematically showing another example of a steering system. The steering system 30' shown in FIG. 6 is a so-called "variable gear ratio steering" (VGRS). The steering system 30' is provided with a variable gear ratio actuator 41 and power assist actuator 42.

The variable gear ratio actuator 41 is provided at a steering shaft 47 mechanically coupling the steering wheel 82 and wheels 85. The variable gear ratio actuator 41 can change the steering gear ratio (ratio of steering angle of steering wheel 82 and turning angle of wheels 85) seamlessly. For this reason, the steering system 30' can control the turning angle of the wheels 85 regardless of the steering angle of the steering wheel 82.

The power assist actuator 42 drives the shaft 46 between the tie rods to control the turning angle of the wheels 85 and steering angle of the steering wheel 82. At this time, the turning angle of the wheels 85 with respect to the steering angle of the steering wheel 82 is determined by the steering gear ratio set by the variable gear ratio actuator 41. The variable gear ratio actuator 41 and power assist actuator 42 are connected to the ECU 20. The operations of the variable gear ratio actuator 41 and power assist actuator 42 are controlled by the ECU 20. Note that, the power assist actuator 42 may be provided at the steering shaft 47.

If the control system 1 of a vehicle is provided with a steering system 30', the control routine of the steering processing of the vehicle of FIG. 4 is performed as follows: At step S103, the steering control part 22 sets the value, which is calculated from the steering gear ratio set at manual driving and the target turning angle set at step S102, as the target steering angle. Further, if at step S106, the target steering angle has changed, at step S105, the steering control part 22 uses the steering system 30' to change the steering gear ratio to the ratio of the target steering angle set at step S106 and the target turning angle set at step S102.

Second Embodiment

The configuration and control of the control system of a vehicle according to the second embodiment basically are similar to the configuration and control of the control system of a vehicle according to the first embodiment except for the points explained below. For this reason, below, in the second embodiment of the present disclosure, primarily the parts different from the first embodiment will be explained.

The steering angle when both eyes of the driver are hidden by the steering wheel 82 changes according to the physical characteristics of the driver etc. For this reason, when setting the upper limit value of the target steering angle to a predetermined fixed value, it is necessary to reduce the upper limit value to deal with all sorts of drivers. As a result, the amount of turning of the steering wheel 82 in automated driving of the vehicle 80 becomes remarkably smaller than the time of manual driving, and the driver is liable to be made to feel uncomfortable.

Therefore, in the second embodiment, the steering control part 22 sets the upper limit value of the target steering angle based on the facial image of the driver generated by the driver monitor camera 10 when the steering wheel 82 is operated. By doing this, it is possible to set the upper limit value of the target steering angle large and possible to reduce the uncomfortable feeling given to the driver.

Figure 7:
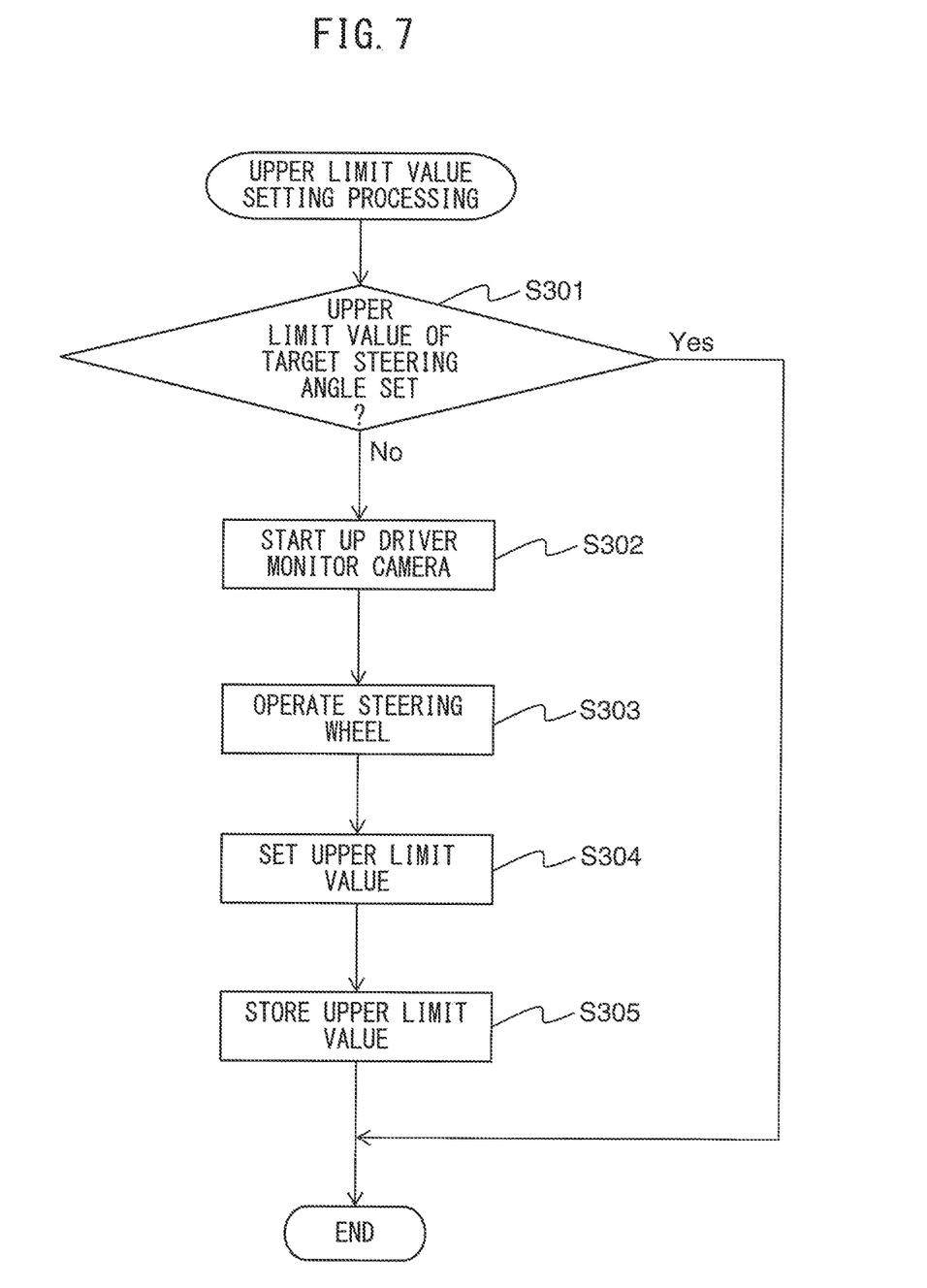
FIG. 7 is a flow chart showing a control routine of upper limit value setting processing in a second embodiment.

FIG. 7 is a flow chart showing a control routine of the upper limit value setting processing in the second embodiment. The present control routine is performed by the ECU 20 after the ignition switch of the vehicle 80 is turned on. In the present control routine, the upper limit value of the target steering angle is set.

First, at step S301, the steering control part 22 judges whether the upper limit value of the target steering angle has already been set. The steering control part 22 judges that the upper limit value of the target steering angle has already been set if the upper limit value of the target steering angle is stored in the ROM or RAM of the ECU 20. If at step S301 it is judged that the upper limit value of the target steering angle has already been set, the present control routine is ended. On the other hand, if it is judged that the upper limit value of the target steering angle has not been set, the present control routine proceeds to step S302.

At step S302, the driver condition detection part 21 starts up the driver monitor camera 10. The driver monitor camera 10 captures the face of the driver of the vehicle 80 to generate a facial image of the driver. The generated facial image is sent to the driver condition detection part 21.

Next, at step S303, the steering control part 22 operates the steering wheel 82. Specifically, the steering control part 22 gradually increases the steering angle of the steering wheel 82. During this operation, the driver condition detection part 21 judges whether main parts of the face have been hidden by the steering wheel 82 in the facial image of the driver generated by the driver monitor camera 10. As a result, the driver condition detection part 21 detects the maximum angle of the steering angle when one eye of the driver is not hidden by the steering wheel 82 in the facial image of the driver.

Next, at step S304, the steering control part 22 sets the upper limit value of the target steering angle. At this time, the steering control part 22 sets the upper limit value of the target steering angle to the maximum angle detected at step S303 or less. For example, the steering control part 22 sets the upper limit value of the target steering angle to the maximum angle detected at step S303. Next, at step S305, the steering control part 22 stores the upper limit value of the target steering angle in the ROM or RAM of the ECU 20. After step S305, the present control routine is ended.

Note that, the upper limit value of the target steering angle may be set for each driver. By doing this, even if the vehicle 80 is utilized by several drivers, the upper limit value of the target steering angle can be set to a suitable value.

For example, at step S301, the driver of the vehicle 80 may be identified and it may be judged whether the upper limit value of the target steering angle for the identified driver has already been set. In this case, at step S301, the driver monitor camera 10 is started up and the driver condition detection part 21 matches the generated facial image against the facial data stored in advance in the ROM or RAM of the ECU 20 to identify the driver of the vehicle 80. Further, at step S305, the steering control part 22 stores the upper limit value of the target steering angle together with facial data of the driver in the ROM or RAM of the ECU 20.

Further, step S301 may be omitted. That is, the steering control part 22 may update the upper limit value of the target steering angle each time the ignition switch of the vehicle 80 is turned on. In this case as well, the upper limit value of the target steering angle is set for each driver.

Third Embodiment

The configuration and control of the control system of a vehicle according to the third embodiment basically are similar to the configuration and control of the control system of a vehicle according to the first embodiment except for the points explained below. For this reason, below, in the third embodiment of the present disclosure, primarily the parts different from the first embodiment will be explained.

In order to judge whether the driver is looking aside, it is necessary to detect the line of sight or facial direction of the driver. Further, in some embodiments, both eyes of the driver are detectable in order to detect the line of sight or facial direction of the driver. Therefore, in the third embodiment, the steering control part 22 makes the upper limit value of the target steering angle the maximum angle when the both eyes of the driver are not hidden by the steering wheel 82 in the facial image of the driven generated when the driver is facing the front. By doing this, the driver condition detection part 21 can detect the line of sight or facial direction of the driver.

In the third embodiment as well, the control routine of the vehicle steering processing shown in FIG. 4 is performed. At this time, the upper limit value of the target steering angle used in the judgment of step S104 is set to the maximum angle when both eyes of the driver are not hidden by the steering wheel 82 in the facial image of the driver generated when the driver is facing the front. In this case, the upper limit value of the target steering angle is, for example, 30°. Note that, the upper limit value may be a value different for each steering direction of the steering wheel 82.

Figure 8:
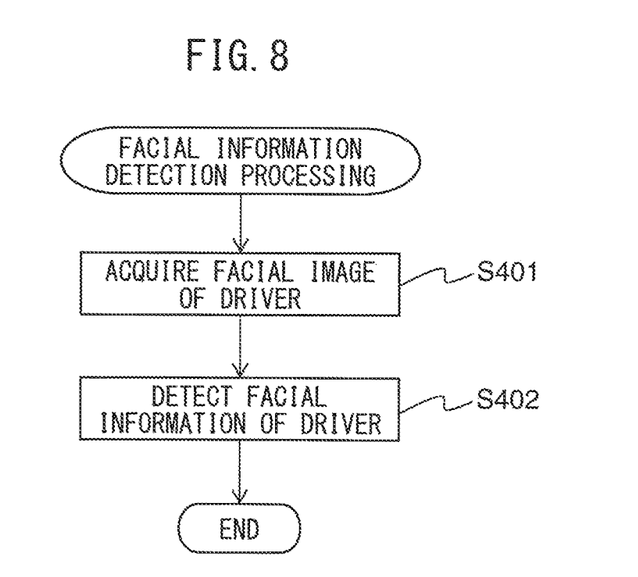
FIG. 8 is a flow chart showing a control routine of facial information detection processing in a third embodiment.

FIG. 8 is a flow chart showing a control routine of facial information detection processing in the third embodiment. The present control routine is repeatedly performed by the ECU 20 while automated driving of the vehicle 80 is performed. In the present control routine, the facial information of the driver is detected.

First, at step S401, the driver condition detection part 21 acquires the facial image of the driver from the driver monitor camera 10. The facial image of the driver is generated by the driver monitor camera 10.

Next, at step S402, the driver condition detection part 21 detects the facial information of the driver based on the facial image of the driver. Specifically, the driver condition detection part 21 detects the line of sight or facial direction of the driver and the opening degree of the both eyes. After step S402, the present control routine ends.

The driver condition detection part 21 detects the line of sight of the driver by, for example, the following method. The driver condition detection part 21 identifies the facial region of the facial image of the driver and detects the both eyes by extracting feature points of the both eyes. Furthermore, the driver condition detection part 21 detects the position of the Purkinje image (corneal reflection image) and the position of the pupil center, and detects the line of sight of the driver from the positional relation of the Purkinje image and pupil center.

Further, the driver condition detection part 21 detects the facial direction of the driver by, for example, the following method. The driver condition detection part 21 stores in advance 3D facial shape data when the driver faces the front. The 3D facial shape data may be data of the faces of general persons or may be acquired for each driver. The 3D facial shape data is stored, for example, in the ROM or RAM of the ECU 20. The driver condition detection part 21 matches the generated facial image of the driver with the 3D facial shape data. The driver condition detection part 21 rotates the facial image of the driver so that the match between the two becomes maximum, and detects the facial direction of the driver from the rotational angle at this time. Note that, the driver condition detection part 21 may detect the facial direction of the driver from the positional relationship between the facial region and the facial parts (mouth, nose, and both eyes). Further, the driver condition detection part 21 detects the degree of opening of the both eyes by extracting feature points of the upper eyelids and lower eyelids of the both eyes.

Figure 9:
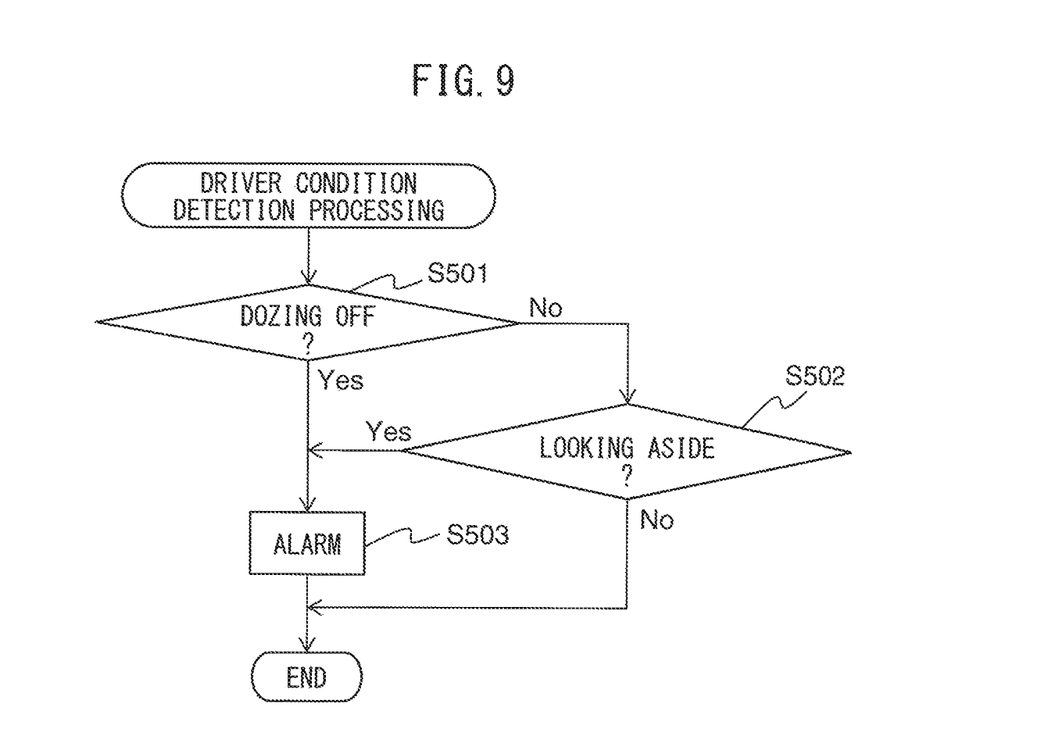
FIG. 9 is a flow chart showing a control routine of driver condition detection processing in the third embodiment.

FIG. 9 is a flow chart showing a control routine of driver condition detection processing in the third embodiment. The present control routine is repeatedly performed by the ECU 20 while automated driving of the vehicle 80 is performed. In the present control routine, the driver condition is detected.

First, at step S501, the driver condition detection part 21 judges whether the driver has dozed off. The driver condition detection part 21 judges that the driver has dozed off if the both eyes of the driver remain closed for a predetermined time or more, while judges that the driver has not dozed off if the both eyes of the driver do not remain closed for a predetermined time or more. The degree of opening of the both eyes of the driver is detected at step S402 of FIG. 8.

If at step S501 it is judged that the driver has not dozed off, the present control routine proceeds to step S502. At step S502, the driver condition detection part 21 judges whether the driver is looking aside. The driver condition detection part 21 judges that the driver is looking aside if the line of sight or facial direction of the driver is outside a predetermined range for a predetermined time or more, while judges that the driver is not looking aside if the line of sight or facial direction of the driver is not outside a predetermined range for a predetermined time or more. The line of sight or facial direction of the driver is detected at step S402 of FIG. 8. If at step S502 it is judged that the driver is not looking aside, the present control routine is ended.

On the other hand, if at step S501 it is judged that the driver is dozing off or if at step S502 it is judged that the driver is looking aside, the present control routine proceeds to step S503. At step S503, the driver condition detection part 21 emits an alarm to the driver. For example, the driver condition detection part 21 emits a visual or audio alarm to the driver through a human-machine interface (HMI) etc., provided in the vehicle. After step S503, the present control routine is ended.

Above, embodiments according to the present disclosure were explained, but the present disclosure is not limited to these embodiments and may be corrected and changed in various ways within the scope of the claims. Further, the above embodiments may be worked in any combination. For example, in the third embodiment, a control routine of processing for setting the upper limit value of FIG. 7 may be performed for setting the upper limit value of the target steering angle.

The invention claimed is:

1. A control system of a vehicle comprising:
a driver monitor camera configured to capture a face of a driver of a vehicle to generate a facial image of the driver,
a driver condition detection part configured to detect a condition of the driver based on the facial image,
a steering system configured to operate wheels and a steering wheel of the vehicle, the steering wheel is positioned between the driver and the driver monitor camera such that the steering wheel can, at times, hide an eye or the eyes of the driver from the driver monitor camera, and
a steering control part configured to control the steering system by setting a target turning angle of the wheels and setting a target steering angle of the steering wheel, wherein
the steering control part is configured to set an upper limit value of the target steering angle to a value less than a maximum angle when at least one eye of the driver is not hidden by the steering wheel in the facial image generated by the driver monitor camera when the driver is facing a front of the vehicle.

2. The control system of a vehicle according to claim 1, wherein the steering control part sets the upper limit value of the target steering angle equal to the maximum angle.

3. The control system of a vehicle according to claim 1, wherein the driver condition detection part is configured to detect a line of sight or a facial direction of the driver, and the steering control part is configured to set the upper limit value of the target steering angle to a maximum angle when both eyes of the driver are not hidden by the steering wheel in the facial image generated by the driver monitor camera when the driver is facing the front of the vehicle.

4. The control system of a vehicle according to claim 1, wherein the steering control part is configured to set the upper limit value of the target steering angle based on the facial image generated by the driver monitor camera when the steering wheel is operated.

5. The control system of a vehicle according to claim 2, wherein the steering control part is configured to set the upper limit value of the target steering angle based on the facial image generated by the driver monitor camera when the steering wheel is operated.

6. The control system of a vehicle according to claim 3, wherein the steering control part is configured to set the upper limit value of the target steering angle based on the facial image generated by the driver monitor camera when the steering wheel is operated.

7. The control system of a vehicle according to claim 4, wherein the steering control part is configured to set the upper limit value of the target steering angle for each of a plurality of drivers.

8. The control system of a vehicle according to claim 5, wherein the steering control part is configured to set the upper limit value of the target steering angle for each of a plurality of drivers.

9. The control system of a vehicle according to claim 6, wherein the steering control part is configured to set the upper limit value of the target steering angle for each of a plurality of drivers.

\* \* \* \* \*

UNITED STATES PATENT AND TRADEMARK OFFICE
CERTIFICATE OF CORRECTION

PATENT NO.         : 10,706,299 B2
APPLICATION NO.    : 15/870533
DATED              : July 7, 2020
INVENTOR(S)        : Takeshi Matsumura It is certified that error appears in the above-identified patent and that said Letters Patent is hereby corrected as shown below:

On the Title Page

Item (72), inventor, city, delete "Numazu" and insert --Numazu-shi, Shizuoka-ken--, therefor.

In the Claims

In Column 10, Line(s) 64, Claim 8, delete "claim $^{5.}$" and insert --claim 5,--, therefor.

Signed and Sealed this
Twenty-seventh Day of October, 2020

Andrei Iancu
*Director of the United States Patent and Trademark Office*